United States Patent

[11] 3,609,148

| | | |
|---|---|---|
| [72] | Inventors | Karl Hoegerle<br>Basle;<br>Christian Vogel, Binningen near Basle;<br>Jurg Rumpf, Binningen near Basle, all of Switzerland |
| [21] | Appl. No. | 818,432 |
| [22] | Filed | Apr. 22, 1969 |
| [45] | Patented | Sept. 28, 1971 |
| [73] | Assignee | Geigy Chemical Corporation<br>Ardsley, N.Y. |
| [32] | Priority | May 6, 1968 |
| [33] | | Switzerland |
| [31] | | 6700 |

[54] HERBICIDAL PYRIDO[1,2-A]-S-TRIAZINE-DIONES
6 Claims, No Drawings

[52] U.S. Cl. .................................................. 260/248,
71/93, 260/295
[51] Int. Cl. ......................................................... C07d 57/04
[50] Field of Search ........................................... 260/248 NS

[56] References Cited
OTHER REFERENCES

Degener et al., Angew Chem., Int. Ed. Engl., Vol. 5, p. 960 (1966) QD 1.Z51

Blatter et al., Tetrahedron Letters, pp. 1087– 1091 (1964) QD 241.T42

*Primary Examiner* — John M. Ford
*Attorneys* — Karl F. Jorda and Frederick H. Rabin ABSTRACT: Pyrido[1,2-a]-s-triazine-diones of the formula

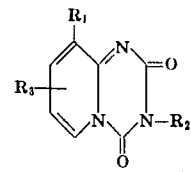

wherein
$R_1$ represents hydrogen, halogen, nitro, lower alkyl, lower alkoxy, or halogenalkyl,
$R_2$ represents straight- or branched-chain alkyl, lower alkenyl, lower alkynyl, cycloalkyl, alkoxyalkyl or halogenalkyl, and
$R_3$ represents hydrogen, halogen, nitro, lower alkyl, lower alkoxy or halogenalkyl,
are disclosed as herbicidally active compounds. A method of controlling undesirable plant growth with the aid of such compounds and compositions containing them are also described.

HERBICIDAL PYRIDO[1,2-A]-S-TRIAZINE-DIONES

DESCRIPTION OF THE INVENTION

The present invention relates to new pyrido[1,2-a]-s-triazine-diones, a process for the preparation of these new compounds, herbicidal agents which contain these pyrido[1,2-a]-s-triazine-diones as the active substances, and a process for the control of weeds and unwanted grasses using the new active substances or agents containing them.

More in particular, the invention provides new herbicidal pyrido[1,2-a]-s-triazine-diones of the formula I:

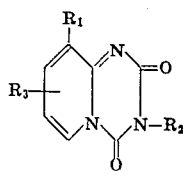

(I)

wherein
$R_1$ represents hydrogen, halogen, nitro, lower alkyl, lower alkoxy or halogenalkyl,
$R_2$ represents straight- or branched-chain alkyl, lower alkenyl, lower alkynyl, cycloalkyl, alkoxyalkyl or halogenalkyl, and
$R_3$ represents hydrogen, halogen, nitro, lower alkyl, lower alkoxy or halogenalkyl.

In formula I, lower alkyl radicals $R_1$ and $R_3$ include straight-chain radicals containing 1 to 5 carbon atoms, for example methyl, ethyl, n-propyl, isopropyl, n-butyl, tert-butyl, isobutyl or pentyl radicals. Lower alkoxy radicals $R_1$ and $R_3$ also contain 1 to 4 carbon atoms, for example, methoxy, isopropoxy, n-butoxy and isobutoxy. As halogenalkyl radicals $R_1$, $R_2$ and $R_3$ are meant also lower alkyl radicals which are substituted one or more times by fluorine, chlorine and/or bromine. By straight chain alkyl radical $R_2$ are meant those having from 1 to 8 and by branched-chain alkyl radicals $R_2$ those having from 3 to 8 carbon atoms, by lower alkenyl radical $R_2$ those having from 2 to 4 carbon atoms, especially the allyl or methallyl radical and by lower alkynyl radical $R_2$ those having from 2 to 4 carbon atoms such as the propynyl or 1-methyl-propynyl radical. Cycloalkyl radicals $R_2$ are monocyclic or polycyclic aliphatic radicals containing 3 to 9 carbon atoms, for example cyclopropyl, 1-methyl-cyclopropyl, cyclobutyl, cyclopentyl, cyclohexyl, cycloheptyl, cyclooctyl, bicyclohexyl, bicyclo-heptyl, bicyclo-octyl, tricyclo-nonyl, tetra-cyclo-nonyl. Moieties forming a part of substituents, for example those in alkoxyalkyl, have each from 1 to 3 carbon atoms. By halogen is meant, for $R_1$ and $R_3$, fluorine, chlorine or bromine.

The new pyrido[1,2-a]-s-triazine-diones of formula I are prepared according to the invention by reacting 1 mol of a 2-aminopyridine of formula II

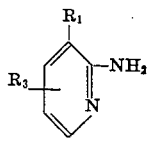

(II)

with 3 mols of an isocyanate of formula III:
$R_2NCO$ (III)

Pyrido[1,2-a]-s-triazine-diones of formula I are obtained by another process by reacting 1 mol of a pyridylcarbamic acid ester of formula IV

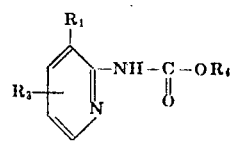

(IV)

in which $R_4$ represents a lower alkyl radical with 2 mols of an isocyanate of formula III.

In the formulas II to IV, the symbols $R_1$ to $R_3$ have the meanings given for formula I. These reactions are preferably carried out in the presence of basic condensing agents and solvents or diluents which are inert to the reactants. Suitable solvents are, for example, aromatic and aliphatic hydrocarbons and halogenated hydrocarbons, N,N-dialkylated carboxylic acid amines, ether and etherlike compounds, nitriles etc. Pyridine and pyridine bases are particularly suitable as solvents for these reactions with isocyanates, sine they serve at the same time as basic condensing agents. Other tertiary amines, such as trialkylamines, may also serve as basic condensing agents.

Pyrido[1,2-a]-s-triazine-diones of formula I are also obtained by reacting a pyrido[1,2-a]-s-triazine-dione of formula V

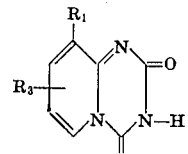

(V)

with a strong base and a compound of formula VI,
$R_2$—X (VI) in which X represents halogen or an alkylsulphonyloxy group. In the formulas V and VI, $R_1$, $R_2$ and $R_3$ have the meanings given in formula I. Strong bases suitable for these reactions are alkali metal amides, alkali metal hydrides, alkali metal borohydrides, alkali metal alcoholates and alkali metal hydroxides. Further, the use of solvents or diluents such as were mentioned above is advisable. The pyrido[1,2-a]-s-triazine-diones of the formula V are converted into the corresponding alkali metal salts by said bases. The compounds of formula VI are esters of hydrohalic acids, especially those of hydrogen chloride, hydrogen bromide and hydrogen iodide, and of sulfuric acid, for example, the corresponding alkyl, alkenyl, alkynyl and cycloalkyl halides or dialkyl sulfates. Aqueous sodium hydroxide solutions are preferably used as the strong base for the reaction of a pyrido[1,2-a]-s-triazine-dione of formula V with a sulfate corresponding to formula VI.

In addition, pyrido[1,2-a]-s-triazine-diones of formula I can also be produced when a N-pyridyl-urea of the formula VII

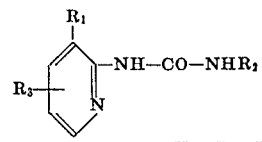

(VII)

wherein $R_1$, $R_2$ and $R_3$ have the meanings given in formula I is reacted with the chloride or an ester of the chloroformic acid. It is advisable to carry out this reaction in the presence of solvents or diluents which are inert to the reactants. Suitable solvents are, for instance, aromatic and aliphatic hydrocarbons and halogenated hydrocarbons, N,N-dialkylated carboxylic acid amides, ether and etherlike compounds.

The pyridylcarbamic acid esters of formula IV serving as starting substances for the preparation of the new pyrido-s-triazines may be prepared by reacting an aminopyridine of the formula II

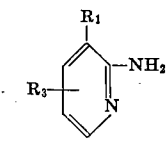

(II)

with haloformic acid alkyl esters, preferably ethyl chloromethanoate, in the presence of a basic condensing agent.

The pyrido[1,2-a]-s-triazine-2,4-diones of formula V mentioned as starting substances were not previously known. These compounds may be prepared by reacting an aminopyridino of formula VII with carbo-ethoxy-isocyanate to give an ethyl allophanate of formula VIII

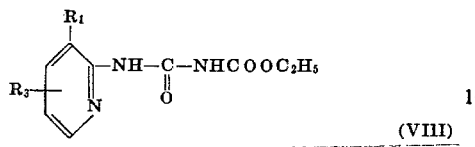

(VIII)

and converting this into a pyrido[1,2-a]-s-triazine-2,4-dione of formula V by ring closure with a basic condensing agent. Suitable basic condensing agents are inorganic bases, especially alkali metal hydroxides.

The starting pyridyl-urea compounds of formula VII may be prepared by reacting a 2-amino-pyridine of the formula II with an isocyanate of the formula III in a solvent or diluent inert to the reactants such as those usable for the reactions of compounds of the formulas II and IV with isocyanates of the formula III and optionally in the presence of a basic condensing agent such as inorganic bases.

The new pyrido[1,2-a-]-s-triazine-diones of the formula I have excellent herbicidal properties and can be used for the control of mono- and di-cotyledonous weeds and unwanted grasses. In concentrations of 6 kg./ha and higher, the active substances according to the invention act as total herbicides, and in concentrations of less than 6 kg./ha, and preferably less than 3 kg./ha as selective herbicides. Types of weed which are difficult to control and those which are deep-rooting, for example, grasses, Leguminosae and Umbelliferae are attacked by the new substances. The application of the active substances may be effected with the same good result, both in the preemergent and in the post-emergent stages of the plants.

Those compounds of formula I wherein $R_1$ represents hydrogen or an alkyl radical of 1 to 5 carbon atoms, $R_2$ represents a branched-chain alkyl radical of 3 to 8 carbon atoms or a cycloalkyl radical with 3 to 9 carbon atoms, and $R_3$ is hydrogen and more particularly those wherein $R_2$ represents a branched-chain alkyl radical linked to the triazine ring by way of the branched carbon atom such as for example, isopropyl, sec-butyl, tert-butyl, sec-pentyl, tert-pentyl and also a cycloaklyl radical are particularly preferred.

Such active substances are selective and may serve for the control of weeds in cultivated crops, for example for the control of types of millet (Panicum sp.), types of mustard (Sinapis sp.), types of goosefoot or fat hen (Chenopodiaceae), annual meadow grass (poa annua), field foxtail grass (Alopecurus agrestis), camomile (Matricaria), parsnip Pastinaca sativa), without damage to useful plants such as cereals, maize, root vegetables, oil plants, vegetables, cotton, sorghum, soya beans and lucerne, before or after emergence.

For the preparation of herbicidal compositions, the active substances are admixed with suitable carriers and/or dispersing agents. In order to broaden the sphere of action of the triazine derivatives according to the invention, these agents may be mixed with other herbicides, for example herbicides from the triazine series, such as halodiamino-s-triazines, alkoxy- and alkylthio-diamino-s-triazines, triazoles, diazines such as uracils, aliphatic carboxylic acids and halocarboxylic acids, halogenated benzoic acids and phenylacetic acids, aryloxyalkane-carboxylic acids, hydrazides, amides, nitriles, esters of such carboxylic acids, carbamic acid and thiocarbamic acid esters, ureas etc.

Examples of such admissible herbicidal substances are the following compounds:

2-chloro-4,6-bis-(ethylamino)-s-triazine
2-chloro-4-ethylamino-6-isopropylamino-s-triazine
2-chloro-4,6-bis-(methoxypropylamino)-s-triazine
2-methoxy-4,6-bis-(isopropylamino)-s-triazine
2-diethylamno-4-isopropylacetamido-6-methoxy-s-triazine
2-isopropylamino-4-methoxypropylamino-6-methylmercapto-s-triazine
2-methylmercapto-4,6-bis-(isopropylamino)-s-triazine
2-methylmercapto-4,6-bis-(ethylamino)-s-triazine
2-methylmercapto-4-ethylamino-6-isopropylamino-s-triazine
2-methoxy-4,6-bis-(ethylamino)-s-triazine
2-methoxy-4-ethylamino-6-isopropylamino-s-triazine
2-chloro-4,6-bis-(isopropylamino)-s-triazine
5-bromo-3-sec.butyl-o-methyl-uracil
3-cyclohexyl-5,6-trimethylene-uracil
5-amino-5-chloro-1-phenyl-pyridazone-(6)
3,6-dioxo-1,2,3,6-tetrahydropyridazine
dinitro-sec.butylphenyl and its salts
pentachlorophenol and its salts
trichloracetic acid and its salts 2,2-dichloropropionic acid and its salts 2-chloro-N,N-diallylacetamide
maleic acid hydrazide
2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,6-dichlorobenzonitrile
2,6-dichlorothiobenzamide
2,3,6-trichlorophenylacetic acid and its salts
2,4-dichlorophenoxyacetic acid and its salts
2,4,5-trichlorophenoxyacetic acid and its salts and esters
(2-methyl-4-chlorophenoxy)-acetic acid and its salts and esters
2-(2,4,5-trichlorophenoxy)-propionic acid and its salts and esters
2-(2,4,5-trichlorophenoxy)-ethyl-2,2-dichloropropionate
4-(2,4-dichlorophenoxy)-butyric acid and its salts and esters
4-(2-methyl-4-chlorophenoxy)-butyric acid and its salts and esters
2,3,6-trichlorobenzyloxypropanol
4-amino-3,5,6-trichloropicolinic acid
N'-cyclooctyl-N,N-dimethylurea
3-phenyl-1,1-dimethylurea
3-(4'-chlorophenyl)-1,1-dimethylurea
3-(3'-trifluoromethylphenyl)-1,1-dimethylurea
3-(3',4'-dichlorophenyl)-1,1-dimethylurea
3-(3',4'-dichlorophenyl)-1-n-butyl-1-methylurea
3-(3',4'-dichlorophenyl)-1,1,3-trimethylurea
3-(3',4'-dichlorophenyl 1,1-diethylurea
3-(4'-chlorophenyl)-1-methoxy-1-methylurea
3-(3',4'-dichlorophenyl)-1-methoxy-1-methylurea
3-4'-bromophenyl)-1-methoxy-1-methylurea
3-(3',4'(dichlorophenyl)-3-methoxy-1,1-dimethylurea
3-(4'-chlorophenoxyphenyl)-1,1-dimethylurea
N,N-di-(n-propyl)-S-ethyl-thiolcarbamic acid ester
N,N-di-(n-propyl)-S-n-propyl-thiolcarbamic acid ester
N-ethyl-N-(n-butyl)-S-n-propyl-thiolcarbamic acid ester
N-phenyl-0-isopropyl-carbamic acid ester
N-(m-chlorophenyl)-0-isopropyl-carbamic acid ester
N-(m-chlorophenyl)-0-4-chlorobutin-(2)-yl-carbamic acid ester
N-(3',4'-dichlorophenyl)-0-methylcarbamic acid ester.

The following examples illustrate the process for the preparation of the new compounds of formula I. Provided nothing else is indicated, the temperatures are given in degrees Centigrade, and percentages are by weight.

EXAMPLE 1

A solution of 10.8 g. (0.1 mol) of 2-amino-3-methyl-pyridine and 41.5 g. (0.35 mol) of cyclohexyl isocyanate in 150 ml. of absolute pyridine is heated under reflux for 16 hours. After evaporation of the solution in vacuo the residue is washed with ether on a suction filter. In order to separate the 1,3-dicyclohexylurea formed as byproduct, the filtered material is extracted with methylene chloride and the filtrate is then filtered through a column of 100 g. of aluminum oxide (activity I). After evaporating the solution and recrystallizing the residue from methylene chlorid-petrol ether, 19.3 g. (74.%) of 3-cyclohexyl-9-methyl-2H-pyrido[1,2-a]-s-triazine-2,4(3H)-dione, m.p. 179°–180° are obtained.

EXAMPLE 2

8.3 g. (0.05 mol) of 2-ethoxycarbonylaminopyridine are treated with 9.4 g. (0.11 mol) of isopropyl isocyanate in 75 ml. of absolute pyridine. The mixture is boiled under reflux overnight. After evaporating the pyridine in vacuo, the residue is treated with ether and filtered with suction. The crude product is purified by dissolving in methylene chloride, filtering the solution through aluminum oxide (activity I) and recrystallizing the residue after evaporation from chloroform-ether. 4.0 g. (39%) of 3-isopropyl-2H-pyrido[1,2-a]-s-triazine-2,4(3H)-dione, m.p. 181–182°, are thus obtained.

EXAMPLE 3

1.95 g. (0.04 mol) of a marketed 50% dispersion of sodium hydride in oil are made into a suspension with absolute ether. The ether is separated and replaced by 40 ml. of absolute dimethyl formamide. 6.5 g. (0.04 mol.) of 2H-pyrido[1,2-a]-s-triazinet2,4(3H)-dione in 40 ml. of dimethyl formamide are added to this suspension and the mixture is then stirred for half an hour. 7.4 g. (0.04 mol) of isobutyl iodide are then added and the mixture is heated at 80° for 3 hours. The clear brown solution is evaporated in vacuo and the residue is treated with water an filtered. The crude product is purified by dissolving in methylene chloride, filtering through aluminum oxide (activity I), and the residue after evaporation is recrystallized from methylene chloride-ether. The yield is 3.3 g. (37.5%) of 3-isobutyl-2H-pyrido[1,2-a]-s-triazine-2,4(3H)-dionne, m.p. 188–190°.

EXAMPLE 4

A solution of 8.15 g. (0.05 mol) of 2H-pyrido-[1,2-a]-s-triazine-2,4(3H)-dione in 27.5 ml. of 2 N caustic soda solution is treated at 15° with 6.95 g. (0.555 mol) of dimethyl sulfate and stirred for 2 hours at room temperature. The crude product obtained by separation and concentration of the mother liquor can be purified by subliming at 200°(0.08 Torr). Yield: 5.5 g. (63%) of 3-methyl-2H-pyrido[1,2-a]-s-triazine-2,4(3H)-dione, m.p. 251–252°.

EXAMPLE 5

A solution of 5.8 g. (0.025 mol) N-3-methylpyridyl-(2) -N'-cyclohexyl-urea in 50 ml. of absolute toluene are added dropwise, while stirring and cooling with ice water, to a solution of 5.0 g. (0.05 mol) phosgene in 50 ml. of absolute toluene. The suspension so formed is then refluxed for 2 hours and at the same time a weak stream of phosgene is bubbled into the suspension. After cooling to room temperature, the precipitate formed is filtered with suction, suspended in 200 ml. of water and the so formed suspension is neutralized with concentrated ammonia. The precipitate is filtered off and dried. 5.85 g, (90%) of 3-cyclohexyl-9-methyl-2H-pyrido [1,2a]-s-triazine 2,4(3H)-dione, m.p. 179°–180°, are thus obtained.

EXAMPLE 6

5.5 g. (0.023 mol) N- 3-methylpyridyl- (2) -N'-cyclohexyl-urea suspended in 100ml. of absolute toluene are refluxed with 25.3 g. (0.23 mol) of chloroformic acid ethyl ester for 15 hours. The solution is evaporated and the remaining oily residue crystallizes. The crystalline residue is recrystallized from benzene-petrol ether. 3.1 g. (52.3%) of 3-cyclohexyl- 9-methyl- 2H-pyrido [1,2-a]-s-triazine- 2.4(3H)-dione of m.p. 179°–180° are obtained.

The 2H-pyrido [1,2-a]-s-triazine- 2,4(3H)-dione used as starting material for Examples 3 and 4 is prepared as follows:

a. 57.5 g. (0.5 mol) of ethoxycarbonyl isocyanate are allowed to drop at 10°–15° with stirring into a solution of 47 g. (0.5 mol) of 2-aminopyridine in 500 ml. of chloroform. The mixture is stirred overnight at room temperature, colorless crystals being precipitated. The precipitate is separated. On recrystallizing the crude product and the residue from evaporation of the filtrate from 400 ml. of ethanol, 88.4 g. (85%) of 3-pyridyl-(2')-allophanic acid ethyl ester of m.p. 142°–144° are obtained.

A solution of 52.3 (0.25 mol) of 3-pyridyl-(2')-allophanic acid ethyl ester in 275 ml. of N-caustic soda solution is stirred for 15 minutes at 60°. After cooling to room temperature, the product is acidified with 20 ml. of glacial acetic acid, the colorless precipitate is separated and washed with a little cold water. The 2H-pyrido-[1,2-a]-s-triazine- 2,4(3H)-dione (37.1 g.=91%) thus obtained is sufficiently pure for the further reactions. A preparation for analysis purified by recrystallizing from water shows a transition point at 213°–216°.

The N- 3-methylpyridyl-(2 ) -N'-cyclohexyl urea used as starting substance for Examples 5 and 6 is prepared according to the process described under (a) but using 62.5 g.(0.5mol) cyclohexylisocyanate instead of 57.5 g. of ethoxy-carbonyliso-cyanate.

The following active substances of general formula I were prepared in an analogous way to that described in Examples 1 to 6.

TABLE I

| Compounds | Melting points, degrees |
|---|---|
| 3-ethyl-2H-pyrido [1, 2-a]-s-triazine-2,4(3H)-dione | 203 |
| 3-n-propyl-2H-pyrido [1, 2-a]-s-triazine-2,4(3H)-dione | 189 |
| 3-(2'-methoxy-ethyl)-2H-pyrido [1, 2-a]-s-triazine 2,4(3H)-dione | 160–162 |
| 3-isopropyl-9-methyl-2H-pyrido [1, 2-a]-s-triazine-2,4(3H)-dione | 166–168 |
| 3-allyl-2H-pyrido [1, 2-a]-s-triazine-2, 4(3H)-dione | 191 |
| 3-n-butyl-2H-pyrido [1, 2-a]-s-triazine-2,4(3H)-dione | 164–166 |
| 3-isopentyl-2H-pyrido [1, 2-a]-s-triazine-2, 4(3H)-dione | 148–150 |
| 3-n-hexyl-2H-pyrido [1, 2-a]-s-triazine-2,4(3H)-dione | 161–163 |
| 3-n-heptyl-2H-pyrido [1, 2-a]-s-triazine-2,4(3H)-dione | 152–154 |
| 3-n-octyl-2H-pyrido [1, 2-a]-s-triazine-2,4(3H)-dione | 159–161 |
| 3-cyclohexyl-2H-pyrido [1,2-a]-s-triazine-2,4(3H)-dione | 165–167 |
| 3-cyclohexyl-7-chloro-2H-pyrido [1,2-a]-s-triazine-2,4(3H)-dione | 175–176.5 |
| 3-cyclohexyl-7,9-dichloro-2H-pyrido [1,2-a]-s-triazine-2,4(3H)-dione | 213–215 |
| 3-cyclohexyl-7-bromo-2H-pyrido [1,2-a]-s-triazine-2,4(3H)-dione | 187–188 |
| 3-cyclohexyl-8-methyl-2H-pyrido [1,2-a]-s-triazine-2,4(3H)-dione | 228–230 |
| 3-[octahydro-1',2',4'-metheno-pentalenyl-(5')]-2H-pyrido [1,2-a]-s-triazine-2,4(3H)-dione | 169.5–171 |
| 3-[octahydro-1',2',4'-metheno-pentalenyl-(5')]-9-methyl-2H-pyrido [1,2-a]-s-triazine-2,4(3H)-dione | 125–128 |
| 3-cyclooctyl-2H-pyrido [1,2-a]-s-triazine-2,4(3H)-dione | 138–140 |
| 3-cyclooctyl-9-methyl-2H-pyrido [1,2-a]-s-triazine-2,4(3H)-dione | 135–137 |
| 3-cyclopropyl-2H-pyrido [1,2-a]-s-triazine-2,4(3H)-dione | 207–209 |
| 3-sec. butyl-2H-pyrido [1,2-a]-s-triazine-2,4(3H)-dione | |
| 3-cyclopentyl-2H-pyrido [1,2-a]-s-triazine-2,4(3H)-dione | 218–219 |
| 3-isopropyl-9-methoxy-2H-pyrido [1,2]-s-triazine-2,4(3H)-dione | |
| 3-sec. butyl-9-methyl-2H-pyrido [1,2-a]-s-triazine-2,4(3H)-dione | 102–103 |
| 3-cyclopentyl-9-methyl-2H-pyrido [1,2-a]-s-triazine-2,4(3H)-dione | 170–172 |
| 3-isopropyl-9-ethyl-2H-pyrido [1,2-a]-s-triazine-2,4(3H)-dione | 145–150 |
| 3-cyclohexyl-9-ethyl-2H-pyrido [1,2-a]-s-triazine-2,4(3H)-dione | 168–171 |
| 3-(1',3'-dimethylbutyl)-2H-pyrido [1,2-a]-s-triazine-2,4(3H)-dione | 97–99 |
| 3-(1',3'-dimethylbutyl)-9-methyl-2H-pyrido [1,2-a]-s-triazine-2,4(3H)-dione | 93–95 |
| 3-cyclopropyl-9-methyl-2H-pyrido[1,2-a]-s-triazine-2,4(3H)-dione | 174–176 |
| 3-isopropyl-7-nitro-2H-pyrido[1,2-a]-s-triazine-2,4(3H)-dione | 191–194 |
| 3-isopropyl-9-nitro-2H-pyrido[1,2-a]-s-triazine-2,4(3H)-dione | |
| 3-cyclohexyl-9-trifluoromethyl-2H-pyrido[1,2-a]-s-triazine-2,4(3H)-dione | |
| 3-isopropyl-9-n-pentyl-2H-pyrido[1,2-a]-s-triazine-2,4(3H)-dione | |
| 3-isopropyl-9-n-butoxy-2H-pyrido[1,2-a]-s-triazine-2,4(3H)-dione | |
| 3-methallyl-2H-pyrido[1,2-a]-s-triazine-2,4(3H)-dione | |
| 3-ethoxypropyl-2H-pyrido[1,2-a]-s-triazine-2,4(3H)-dione | |
| 3-(2'-chlorethyl)-2H-pyrido[1,2-a]-s-triazine-2,4(3H)-dione | |
| 3-cyclohexyl-7-methoxy-2H-pyrido[1,2-a]-s-triazine-2,4(3H)-dione | |
| 3-cyclooctyl-7-trifluoromethyl-2H-pyrido[1,2-a]-s-triazine-2,4(3H)-dione | |
| 3-propynyl-2H-pyrido[1,2-a]-s-triazine-2,4(3H)-dione | |
| 3-bicyclo[4,1,0]-heptyl-(7')-2H-pyrido[1,2-a]-s-triazine-2,4(3H)-dione | |
| 3-bicyclo[4,1,0]-heptyl-(7')-9-methyl-2H-pyrido[1,2-a]-s-triazine-2,4(3H)-dione | |

Table I—Continued

| Compounds | Melting points, degrees |
|---|---|
| 3-bicyclo[3,1,0]-hexyl-(6')-9-methyl-2H-pyrido[1,2-a]-s-triazine-2,4(3H)-dione | |
| 3-bicyclo[3,1,0]-hexyl-(6')-2H-pyrido[1,2-a]-s-triazine-2,4(3H)-dione | |
| 3-propoxypropyl-2H-pyrido[1,2-a]-s-triazine-2,4(3H)-dione | |

The preparation of herbicidal compositions according to the invention is carried out in known way by intimate mixing and grinding of active substances of the general formula I with suitable carriers, possibly with addition of dispersing agents or solvents inert towards these active substances. The active substances may be used in the form of dusts, scattering agents, granulates, coated granulates, impregnated granulates, homogenous granulates, wettable powder pastes, emulsions, solutions or aerosols.

In order to prepare solid finished products (dusts scattering agents, granulates) the active substances are mixed with solid carriers. The granular size of the carrier is suitably up to about 0.1 mm. for dusts, about 0.075 to 0.2 mm. for scattering agents and 0.2 mm. or over for granulates. The concentration of the active substance in the solid finished product usually amounts to 0.5 to 80 %. To these mixtures may also be added substances for stabilizing the active substance and/or nonionic, anionic and cationic substances, which, for example, improve the adhesion of the active substances to plants and parts of plants (adhesives and agglutinants) and or ensure a better wettability (wetting agents) and dispersability (dispersing agents).

Concentrates of active substances dispersible in water, wettable powders, pastes and emulsion concentrates are products which can be diluted with water to any desired concentration. They consist of active substance, carrier, possibly additives for stabilizing the active substance, surface-active substances and antifoaming agents, and possibly solvents. The concentration of active substance in these products amounts to 5 to 80 %. The wettable powders and pastes are obtained by mixing and grinding the active substances with dispersing agents and pulverulent carriers in suitable devices until the products are homogeneous. In some cases it is advantageous to use mixtures of different carriers. The antifoaming agents may, for example, be silicones. The active substances are so mixed, ground, sived and classified with the above-mentioned additives that in the wettable powders the solid fraction does not exceed a grain size of 0.02 to 0.04 and in pastes does not exceed 0.003 mm. Dispersing agents, organic solvents and water are used for the preparation of emulsion concentrates and pastes. The solvents must be practically colorless, nonphytotoxic, inert towards the active substances and not easily combustible.

Further, the compositions according to the invention may be applied in the form of solutions. For this purpose, one or more of the active substances of the general formula I is or are dissolved in suitable organic solvents, mixtures of solvents or water. The solutions should contain the active substances within a range of concentration from 1 to 20 percent calculated on the total weigh of the solutions.

Other biocidal active substances or agents can be admixed with the agents described according to the invention. Thus, in addition to the said compounds of the general formula I and other herbicides, the new agents may contain for example, insecticides, fungicides, bactericides, fungistatic add bacteriostatic substances or nematocides in order to broaden the sphere of action. The compositions according to the invention may also contain plant fertilizers, trace elements etc. In the following compositions according to the invention, all percentages are given by weight.

Granulate

The following substances are used for the preparation of a 5 % granulate:

5 parts of 3-cyclohexyl-8-methyl-2H-pyrido-[1,2-a]-s-triazine-2,4(3H)-dione,
0.25 parts of epichorhydrin,
0.25 parts of cetylpolyglycolether with 8 mol ethyleneoxide,
3.50 parts of polyglycol ("Carbowax")
91.0 parts of kaolin (grain size 0.3–0.8 mm).

The active substance is mixed with epicholorhydrin and dissolved with 6 parts of acetone, then polyglycol and cetylpolyglycolether are added. The solution so obtained is sprayed on kaolin and then the acetone is evaporated in vacuo.

Wettable powder

The following components are used for the preparation of (a) a 50%, (b) a 25% and (c) a 10% wettable powder:

a. 50 parts of 3-cyclohexyl-8-methyl-2H-pyrido [1,2-a]-s-triazine-2,4(3H)-dione
   5 parts of sodium dibutylnaphthysulfonate
   3 parts of naphthalenesulfonic acids-phenol- sulfonic acids-Formaldeyde condensate in the proportion 3:2:1
   20 parts of kaolin
   22 parts of Champagne chalk b. 25 parts of 3-isopropyl-2H-pyrido [1,2-a]-s-triazine-2,4(3 H)-dione
   5 parts of oleylmethyltauride-sodium salt
   2.5 parts of naphthalenesulfonic acid-formaldehyde-condensate
   0.5 parts of carboxymethylcellulose
   5 parts of neutral potassium aluminum silicate 62 parts of kaolin c. 10 parts of 3-isolbutyl-2H-pyrido [1,2-a]-s-triazine-2,4(3H)-dione
   3 parts of a mixture of the sodium salts of saturated fatty alcohol sulfates
   5 parts of napthalenesulfonic acids-formaldehyde-condensate 82 parts of kaoline.

The said active substance is added to the corresponding carrier (kaolin and chalk) and is then mixed and ground. A wettable powder of excellent wettability and suspensibility is obtained. By dilution with water, suspensions of any desired concentration of active substance can be obtained from such wettable powders. Such suspensions may be used for control of weeds and unwanted grasses in cotton plants.

Paste

The following substances are used for the preparation of a 45% paste:

45 parts of 3-isoamyl-2H-pyrido [1,2-a]-s-trazine-2,4(3H)-dione
5 parts of sodium aluminum silicate
14 parts of cetylpolyglycolether (Genapol 0 080)
1 part of cetylpolyglycolether (Genapol 0 050)
2 parts of spindle oil
10 parts of polyglycol (Carbowax)
23 parts of water The active substance is intimately mixed and ground with the additive substances in suitable devices. A paste is obtained from which suspensions of any desired concentration can be prepared by dilution with water.

Emulsion concentrate

For the preparation of a 10% emulsion concentrate,
  10 parts of 3-isopropyl-9-methyl-2H-pyrido [1,2-a]-s-triazone-2,4(3H)-dione
  15 parts of the condensation product of octadeconal and ethylene oxide in a molar ratio of 1:8
  75 parts of isophorone (3,5,5-trimethylcyclohex-2-en-1-one)

mixed together. This concentrate can be diluted with water to give emulsions of suitable concentrations. Such emulsions are suitable for the control of weeds in cultivated crops, as for example cotton maize etc.

The herbicidal action of the pyrido [1,2-a]-s-triazine-diones is shown in the following test reports:

Test substances
  1. 3-n-butyl-2H-pyrido [1,2-a]-s-triazine-2,4(3H)-dione,
  2. 3-isobutyl-2H-pyrido [1,2-a]-s-triazine-2,4(3H)-dione
  3. 3-isopropyl-2H-pyrido [1,2-a]-s-triazine-2,4(3H)-dione
  4. 3-isopropyl-9-methyl-2H-pyrido [1,2-a]-s-triazine-2,4(3H)-dione 5. 3-isopropyl-9-ethyl-2H-pyrido [1,2-a]-s-triazine-2,4(3H)-dione
6. 3-sec-butyl-9methyl-2H-pyrido [1,2-a]s-triazine-2,4(3H)-dione
7. 3-(1', 3'-dimethyl-butyl)-9-methyl-2H-pyrido [1,2-a]-s-triazine-2,4(3H)-dione
8. 3-cyclopropyl- 2H-pyrido [1,2-a]-s-triazine-2,4(3H)-dione
9. 3-cyclopropyl-9-methyl-2H-pyrido[1,2-a]-s-triazine-2,4(3H)-dione
10. 3-cyclopentyl-2H-pyrido[1,2-a]-s-triazine-2,4(3H)-dione
11. 3-cyclopentyl-9-methyl-2H-pyrido[1,2-a]-s-triazine-2,4(3H)-dione
12. 3-cyclohexyl-2H-pyrido[1,2-a]-s-triazine-2,4(3H)-dione
13. 3-cyclohexyl-9-methyl-2H-pyrido[1,2-a]-s-triazine-2,4(3H)-dione
14. 3-cyclooctyl-2H-pyrido[1,2-a]-s-triazine-2,4(3H)-dione
15. 3-[octahydro-1',2',4'-metheno-pentalenyl-(5')]-2H-pyrido[1,2-a]-s-triazine-2,4(3H)-dione
16. 3-[octahydro-1',2',4'-metheno-pentalenyl-(5')]-9-methyl-2H-pyrido-[1,2-a]-s-triazine-2,4(3H)-dione Method The active substance is mixed with the talcum in the ration 1:9 and added to garden soil, so that the concentration of active substance is 0.5 g. per liter of soil. The following test plants are then sown in pots containing the prepared soil:

oats mustard, rye grass, sugar beets, cucumbers, vetch.

The pots are then kept in daylight in a green house at 20 to 24° C. and 70 percent relative humidity.

The test plants are evaluated after 20 days and the evaluation is expressed according to the following scale:

10 = plants undamaged = untreated plants
0 = complete destruction of all plants
9–1 = intermediate degrees of damage

RESULTS

| Active substance | Oats | Rye grass | Mustard | Sugar beets | Cucumber | Vetch |
|---|---|---|---|---|---|---|
| 1 | 4 | 3 | 0 | 1 | 0 | 0 |
| 2 | 4 | 4 | 1 | 2 | 4 | 0 |
| 3 | 2 | 1 | 0 | 0 | 0 | 0 |
| 4 | 0 | 0 | 0 | 0 | 0 | 0 |
| 5 | 3 | 0 | 0 | — | — | 1 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 3 | 1 | 0 | 0 | 0 | 0 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 0 | 0 | 0 | 1 | 0 | 0 |
| 14 | 2 | 2 | 0 | 0 | 0 | 4 |
| 15 | 1 | 0 | 0 | 0 | 0 | 2 |
| 16 | 0 | 0 | 0 | 0 | 0 | 1 |

Field tests (selective effect)

a. Pre-emergence test

The following test plants are sown in a freshly prepared seedbed: Vicia faba, peas, lucerne and flax. The active substance, as an aqueous dispersion prepared from a 25 percent wettable powder, is applied to the surface of the soil directly after sowing.

Indigenous weed present: Chenopodium album, Polygonum persicaria, Capsella bursa pastoris, Sinapis arvesti and Polygonum convolvulus.

Evaluation of the phytotoxic effect upon the cultivated plants and the herbicidal effect on the indigenous weeds was determined after 62 days.

The evaluation of the cultivated plants was determined according to the following scale:

1 = no symptoms or damage (same as untreated cultivated plants)
2–4 = logarithmic increase of reversible phytotoxic symptoms
5–8 = logarithmic increase of irreversible phytotoxic symptoms
9 = complete destruction The herbicidal effect on the weeds is given in percent:
100% = complete destruction
90–10% = intermediate degrees of destruction
0% = no damage (same as untreated control plants).

| Cultivated plants | Active substance | Application concentration (in kg./ha.) | | | | |
|---|---|---|---|---|---|---|
| | | 4 | 3 | 2.5 | 2 | 1.5 |
| Vicia faba | 4 | — | 3 | 2 | 1 | 1 |
| | 13 | 3 | 3 | 3 | 3 | 3 |
| Peas | 4 | — | 3 | 2 | 1 | 1 |
| | 13 | 2 | 1 | 1 | 1 | 1 |
| Lucerne | 13 | — | 3 | 2 | 2 | 1 |
| Flax | 4 | — | 4 | 3 | 2 | 1 |
| | 13 | 1 | 1 | 1 | 1 | 1 |
| Herbicidal effect on indigenous weeds (in percent) | 4 | 100 | 98 | 98 | 95 | 90 |
| | 13 | 98 | 90 | 90 | 80 | 70 | b. Pre-emergence test with planted weeds

The cultivated plants maize, sun flowers and carrots and, as difficulty controllable weeds Galium spec., rye grass and Amaranthus spec. were sown as test plants in a freshly prepared seedbed. Directly after sowing, the active substance, in the form of an aqueous dispersion prepared from 25% wettable powder, was applied to the surface of the ground, to obtain the concentrations in kg. per ha given in the following Table. After 54 days the phytotoxic effect on the cultivated plants and the herbicidal effect on the weeds that had been sown are evaluated:

The evaluation of the cultivated plants was determined according to the following scale:

1 = no symptoms or damage (same as untreated cultivated plants)
2–4 = logarithmic increase of reversible phytotoxic symptoms
5–8 = logarithmic increase of irreversible phytotoxic symptoms
9 = complete destruction The herbicidal effect on the weeds is given in percent:
100% = complete destruction
90–10% = intermediate degrees of destruction
0% = no damage (same as untreated control plants).

For this test the following active substance was used: 3-isopropyl-9-methyl-2H-pyrido[1,2-a]-s-triazine-2,4(3H)-dione. (Active substance 4).

Results:

A. Effect on cultivated plants

| Cultivated plants | Application concentrations (in kg./ha.) | | | | |
|---|---|---|---|---|---|
| | 5 | 4 | 3 | 2.5 | 2 |
| Maize | 1 | 1 | 1 | 1 | 1 |
| Sunflower | 4 | 4 | 4 | 4 | 3 |
| Carrot | 4 | 3 | 2 | 2 | 2 |

B. Effect on weeds

| Weeds | Application concentrations (in kg./ha.) | | | | |
|---|---|---|---|---|---|
| | 5 | 4 | 3 | 2.5 | 2 |
| Galium | 90 | 90 | 90 | 90 | 90 |
| Rye grass | 90 | 90 | 90 | 90 | 90 |
| Amaranthus | 100 | 100 | 100 | 90 | 90 |

Conclusions

Both tests show that the active substances 4 and 13 according to the instant application possess very good herbicidal activity, both against indigenous weeds as well as against the difficulty controllable weeds which had been sown. The cultivated plants showed no, or if any, then only slight, but reversible phytotoxic symptoms.

We claim:
1. A pyrido[1,2-a]-s-triazine-dione of the formula

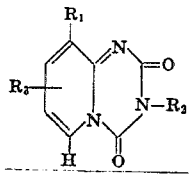

wherein
R₁ represents a member selected from hydrogen, halogen, nitro, lower alkyl, lower alkoxy and halogen-lower alkyl,
R₂ represents a member selected from straight-chain alkyl of from 1 to 8 carbon atoms, branched-chain alkyl of from 3 to 8 carbon atoms, lower alkenyl, lower alkynyl cycloalkyl of from 3 to 9 carbon atoms, alkoxyalkyl of from 3 to 6 carbon atoms and halogen-lower alkyl, and
R₃ represents a member selected from hydrogen, halogen, nitro, lower alkyl, lower alkoxy and halogen-lower alkyl.

2. A pyrido[1,2-a]-s-triazine-dione as defined in claim 1, wherein R₁ represents hydrogen or alkyl of from 1 to 5 carbon atoms, R₂ represents branched-chain alkyl of from 3 to 8 carbon atoms or cycloalkyl of from 3 to 9 carbon atoms, and R₃ is hydrogen.

3. 3-Cyclohexy-9-methyl-2H-pyrido[1,2-a]-s-triazine-2,4(3H)-dione.

4. 3-Isopropyl-9-methyl-2H-pyrido[1,2-a]-s-triazine-2,4(3H)-dione.

5. 3-sec-Butyl-9-methyl-2H-pyrido[1,2-a]-s-triazine-2,4(3H)-dione.

6. A pyrido[1,2-a]-s-triazine-dione of the formula V

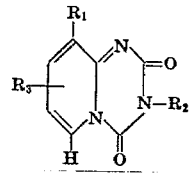

(V)

wherein
R₁ represents a member selected from hydrogen, halogen, nitro, lower alkyl, lower alkoxy and halogen-lower alkyl, and
R₃ represents a member selected from hydrogen, halogen, nitro, lower alkyl, lower alkoxy and halogen-lower alkyl.